United States Patent
Muldoon

(10) Patent No.: US 12,510,026 B1
(45) Date of Patent: Dec. 30, 2025

(54) LUBRICATION SYSTEM FOR AIRCRAFT PROPULSION SYSTEM WITH ELECTRIC MACHINE

(71) Applicant: Raytheon Technologies Corporation, Farmington, CT (US)

(72) Inventor: Marc J. Muldoon, Marlborough, CT (US)

(73) Assignee: RTX CORPORATION, Farmington, CT (US)

(*) Notice: Subject to any disclaimer, the term of this patent is extended or adjusted under 35 U.S.C. 154(b) by 152 days.

(21) Appl. No.: 18/106,281

(22) Filed: Feb. 6, 2023

Related U.S. Application Data

(60) Provisional application No. 63/306,729, filed on Feb. 4, 2022.

(51) Int. Cl.
 *F02C 7/06* (2006.01)
 *F02C 7/36* (2006.01)

(52) U.S. Cl.
 CPC ............... *F02C 7/06* (2013.01); *F02C 7/36* (2013.01); *F05D 2260/40311* (2013.01); *F05D 2260/98* (2013.01)

(58) Field of Classification Search
 CPC ..... F02C 7/06; F02C 7/36; F05D 2260/40311; F05D 2260/98
 USPC ....................................................... 415/122.1
 See application file for complete search history.

(56) References Cited

U.S. PATENT DOCUMENTS

| | | | |
|---|---|---|---|
| 5,253,470 A | 10/1993 | Newton | |
| 7,908,840 B2 * | 3/2011 | Schwarz | F01D 15/10 60/39.08 |
| 8,205,427 B2 | 6/2012 | Schwarz | |
| 8,443,582 B1 | 5/2013 | Phillips | |
| 9,018,821 B2 | 4/2015 | Stiesdal | |
| 9,917,490 B2 | 3/2018 | Lemmers | |
| 10,071,811 B2 | 9/2018 | Kupiszewski | |

(Continued)

FOREIGN PATENT DOCUMENTS

| | | |
|---|---|---|
| EP | 3447243 A1 | 2/2019 |
| EP | 3544152 B1 | 10/2020 |

(Continued)

OTHER PUBLICATIONS

"American National Standard Design Manual for Enclosed Epicyclic Gear Drives", ANSI/AGMA 6023-A88, Nov. 1988.

*Primary Examiner* — Mark A Laurenzi
*Assistant Examiner* — Kelsey L Stanek
(74) *Attorney, Agent, or Firm* — Getz Balich LLC

(57) ABSTRACT

An assembly is provided for an aircraft propulsion system. This aircraft propulsion system assembly includes an electric machine, a rotating structure, a geartrain, a propulsion system component and a lubrication system. The electric machine includes a machine volume and a machine rotor. The rotating structure includes a bladed rotor. The geartrain couples the machine rotor to the rotating structure. The geartrain includes a geartrain volume. The propulsion system component is arranged with the rotating structure. The propulsion system component includes a component volume. The lubrication system includes a lubricant circuit and a lubricant source configured to direct lubricant through the lubricant circuit. The lubricant circuit includes the machine volume, the geartrain volume and the component volume.

17 Claims, 4 Drawing Sheets

(56) References Cited

U.S. PATENT DOCUMENTS

| | | | |
|---|---|---|---|
| 10,308,366 | B2 | 6/2019 | Kupiszewski |
| 10,487,839 | B2 | 11/2019 | Kupiszewski |
| 10,753,280 | B2 | 8/2020 | Thiriet |
| 10,801,410 | B2 | 10/2020 | Roberge |
| 10,975,769 | B2 | 4/2021 | Segura Martinez De Ilarduya |
| 11,085,515 | B2 | 8/2021 | Moniz |
| 2002/0146315 | A1 | 10/2002 | Rockwood |
| 2007/0025642 | A1 | 2/2007 | Buckland et al. |
| 2013/0174575 | A1 | 7/2013 | Ertz |
| 2017/0021147 | A1 | 1/2017 | Predick |
| 2018/0050806 | A1 | 2/2018 | Kupiszewski |
| 2019/0085715 | A1 | 3/2019 | Van Der Merwe |
| 2020/0003157 | A1 | 1/2020 | Clements |
| 2020/0063606 | A1 | 2/2020 | Miller |
| 2020/0277075 | A1 | 9/2020 | Dubreuil |
| 2021/0010382 | A1 | 1/2021 | Davies |
| 2021/0010383 | A1 | 1/2021 | Bradley |
| 2021/0010384 | A1 | 1/2021 | Bradley |
| 2021/0018008 | A1 | 1/2021 | Muldoon |
| 2021/0079850 | A1 | 3/2021 | Davies |
| 2022/0029892 | A1 | 1/2022 | Hooli et al. |
| 2022/0042463 | A1 * | 2/2022 | Molesini ............... F02C 7/06 |
| 2023/0120797 | A1 | 4/2023 | Muldoon |

FOREIGN PATENT DOCUMENTS

| | | | | |
|---|---|---|---|---|
| EP | 2954185 B1 * | 5/2022 | ............ | F01D 25/18 |
| WO | 2020084241 A1 | 4/2020 | | |

* cited by examiner

LUBRICATION SYSTEM FOR AIRCRAFT PROPULSION SYSTEM WITH ELECTRIC MACHINE

This application claims priority to U.S. Patent Appln. No. 63/306,729 filed Feb. 4, 2022 which is hereby incorporated herein by reference in its entirety.

BACKGROUND OF THE DISCLOSURE

1. Technical Field

This disclosure relates generally to an aircraft propulsion system and, more particularly, to a lubrication system for the aircraft propulsion system.

2. Background Information

An aircraft propulsion system with a gas turbine engine may include an electric machine for providing mechanical power and/or electricity. Various lubrication systems are known in the art for providing lubricant to an electric machine. While these known lubrication systems have various benefits, there is still room in the art for improvement. For example, there is a need in the art for a more compact lubrication system which can tailor lubricant temperatures for different engine components.

SUMMARY OF THE DISCLOSURE

According to an aspect of the present disclosure, an assembly is provided for an aircraft propulsion system. This aircraft propulsion system assembly includes an electric machine, a rotating structure, a geartrain, a propulsion system component and a lubrication system. The electric machine includes a machine volume and a machine rotor. The rotating structure includes a bladed rotor. The geartrain couples the machine rotor to the rotating structure. The geartrain includes a geartrain volume. The propulsion system component is arranged with the rotating structure. The propulsion system component includes a component volume. The lubrication system includes a lubricant circuit and a lubricant source configured to direct lubricant through the lubricant circuit. The lubricant circuit includes the machine volume, the geartrain volume and the component volume.

According to another aspect of the present disclosure, an open rotor aircraft propulsion system is provided that includes a gas turbine engine core, an unducted propulsor rotor and an electric machine. The gas turbine engine core includes a rotating structure with a bladed rotor. The unducted propulsor rotor rotatably is driven by the gas turbine engine core. The electric machine includes a machine rotor rotatably coupled with the rotating structure.

According to still another aspect of the present disclosure, another assembly is provided for an aircraft propulsion system. This aircraft propulsion system assembly includes an electric machine, a rotating structure, a propulsion system component and a lubrication system. The electric machine includes a machine volume and a machine rotor. The rotating structure is rotatably coupled to the machine rotor. The rotating structure includes a bladed rotor. The propulsion system component is arranged with the rotating structure. The propulsion system component includes a component volume. The lubrication system includes a lubricant circuit and a lubricant source configured to direct lubricant through the lubricant circuit. The lubricant circuit includes the machine volume and the component volume. The lubrication system also includes a bypass circuit. The lubricant source is also configured to direct the lubricant through the bypass circuit to the component volume to bypass the machine volume.

A geartrain, a bearing and a lubrication system may also be included. The geartrain may couple the machine rotor to the rotating structure. The geartrain may include a geartrain volume. The bearing may be arranged with the rotating structure. The bearing may include a bearing volume. The lubrication system may include a lubricant circuit and a lubricant source configured to direct lubricant through the lubricant circuit. The lubricant circuit may include a machine volume, the geartrain volume and the bearing volume. The electric machine may include the machine volume.

The machine volume may be fluidly coupled between an outlet from the lubricant source and an inlet to the geartrain volume.

The machine volume may be fluidly coupled between an outlet from the lubricant source and an inlet to the component volume.

The geartrain volume may be fluidly coupled between an outlet from the machine volume and an inlet to the component volume.

The lubrication system may also include a bypass circuit. The lubricant source may also be configured to direct the lubricant through the bypass circuit to the component volume to bypass the machine volume and/or the geartrain volume.

The lubricant circuit may include an upstream circuit section and a downstream circuit section. The lubrication system may also include a mixing valve selectively fluidly coupling the bypass circuit and the upstream circuit section to the downstream circuit section.

The upstream circuit section may include the machine volume. The downstream circuit section may include the component volume.

The upstream circuit section may also include the geartrain volume.

The lubrication system may also include a sensor and a controller. The sensor may be configured to output a sensor signal to the controller indicative of a temperature of the lubricant within the upstream circuit section at the mixing valve. The controller may be configured to output a control signal to the mixing valve based on the sensor signal.

The lubrication system may also include a heat exchanger fluidly coupled between the lubricant source and the machine volume.

The electric machine may be configurable as a generator during a generator mode of operation. The electric machine may also or alternatively be configurable as a motor during a motor mode of operation.

The bladed rotor may be configured as or otherwise include a compressor rotor within a compressor section of the aircraft propulsion system.

The bladed rotor may be configured as or otherwise include a turbine rotor within a turbine section of the aircraft propulsion system.

The geartrain may be configured as or otherwise include an epicyclic geartrain.

The propulsion system component may be configured as or otherwise include a bearing rotatably supporting the rotating structure.

The propulsion system component may be configured as or otherwise include a seal assembly.

A gas turbine engine core and an unducted propulsor rotor may be included. The gas turbine engine core may include the rotating structure. The unducted propulsor rotor may be rotatably driven by the gas turbine engine core.

A second geartrain may be included and couple the gas turbine engine core to the unducted propulsor rotor. The second geartrain may include the propulsion system component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
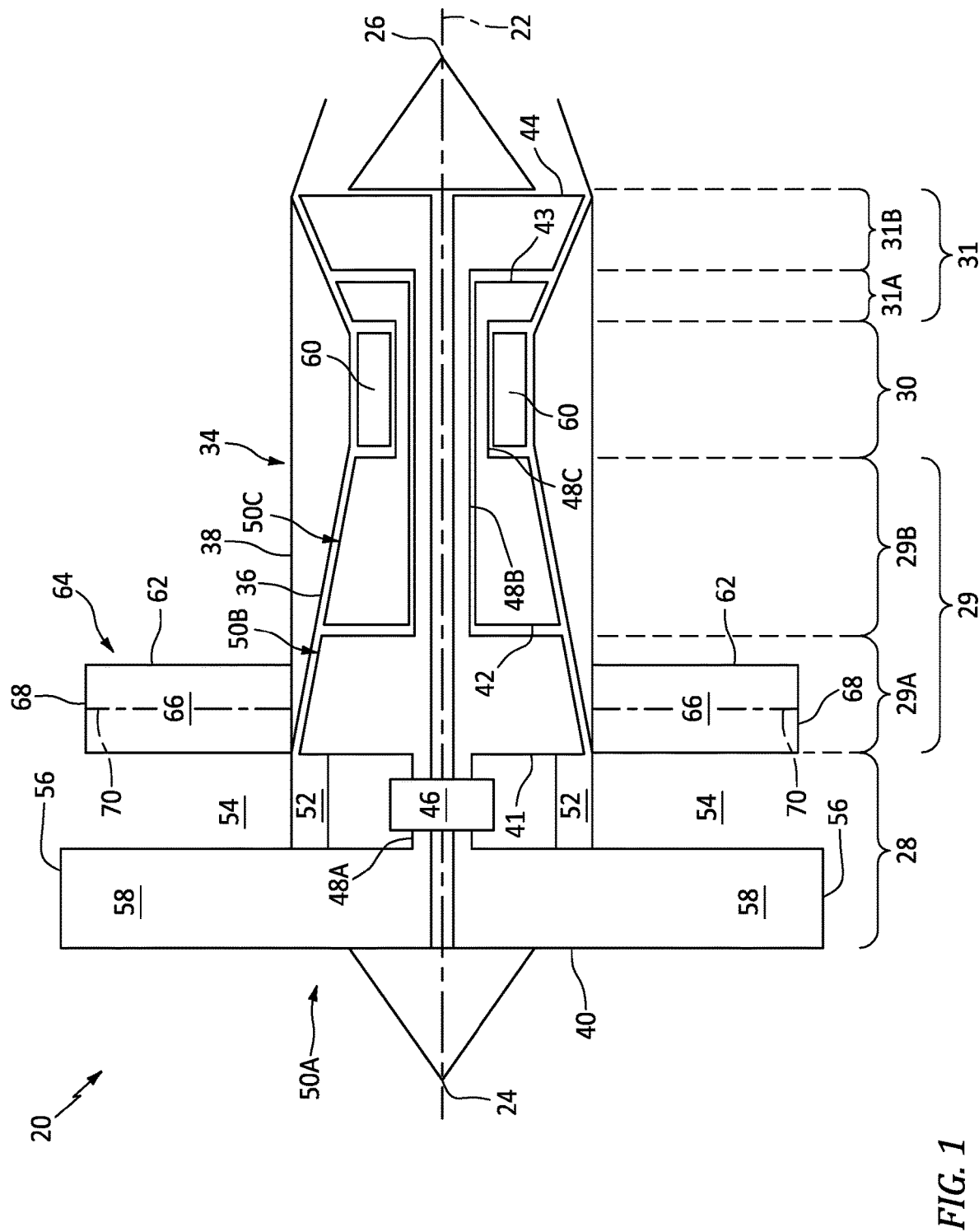
FIG. 1 is a side schematic illustration of an open rotor aircraft propulsion system.

FIG. 1 is a side schematic illustration of an open rotor aircraft propulsion system 20 for an aircraft such as, but not limited to, an airplane. This aircraft propulsion system 20 extends axially along an axial centerline 22 between a forward, upstream end 24 of the aircraft propulsion system 20 and an aft, downstream end 26 of the aircraft propulsion system 20, which axial centerline 22 may also be a rotational axis of the aircraft propulsion system 20. The aircraft propulsion system 20 includes a gas turbine engine with a propulsor (e.g., an un-ducted fan) section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B are arranged sequentially along the axial centerline 22 between the upstream end 24 and the downstream end 26. The propulsor section 28 is configured outside of an engine housing 34 of the aircraft propulsion system 20 at an exterior of the aircraft propulsion system 20 and its engine housing 34. The engine sections 29A-31B are arranged within the engine housing 34. The engine housing 34 of FIG. 1, for example, includes a case 36 and a nacelle 38. The case 36 houses one or more of the engine sections 29A-31B; e.g., a core of the gas turbine engine. The nacelle 38 houses and provides an aerodynamic cover for the case 36.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The open (e.g., unducted) propulsor rotor 40 of FIG. 1 is connected to a geartrain 46, for example, through a propulsor shaft 48A, where the propulsion system components 40 and 48A form or are otherwise included in a propulsor rotating structure 50A. The geartrain 46 and the LPC rotor 41 are connected to and driven by the LPT rotor 44 through a low speed shaft 48B, where the propulsion system components 41, 44 and 48B form or are otherwise included in a low speed rotating structure 50B; e.g., a low speed spool. The open propulsor rotor 40 may thereby be motively coupled to the engine core and its low speed rotating structure 50B. The HPC rotor 42 is connected to and driven by the HPT rotor 43 through a high speed shaft 48C, where the propulsion system components 42, 43 and 48C form or are otherwise included in a high speed rotating structure 50C.

During operation, the open propulsor rotor 40 directs (e.g., propels) an inner stream of air into a core flowpath 52 (e.g., an internal flowpath) within the aircraft propulsion system 20 and its engine core. This core flowpath 52 extends sequentially through the engine sections 29A-31B. The air within the core flowpath 52 may be referred to as core air. The open propulsor rotor 40 also directs (e.g., propels) an outer stream of air into a bypass flowpath 54 (e.g., an external flowpath). This bypass flowpath 54 is in fluid communication with the propulsor section 28 and bypasses the engine core. The bypass flowpath 54 of FIG. 1, more particularly, is an open flowpath at the exterior of the aircraft propulsion system 20. The engine housing 34 and its nacelle 38, for example, may at least partially or completely form an inner peripheral boundary of the bypass flowpath 54 downstream of the open propulsor rotor 40 and along the engine core. An outer peripheral boundary of the bypass flowpath 54 may be defined by a (e.g., imaginary) reference line that extends substantially axially along the axial centerline 22 aft from an outer periphery of the open propulsor rotor 40; e.g., aft from tips 56 of open rotor propulsor blades 58. The air within the bypass flowpath 54 may be referred to as bypass air.

The core air is compressed by the LPC rotor 41 and the HPC rotor 42 and directed into a combustion chamber 60 of a combustor in the combustor section 30. Fuel is injected into the combustion chamber 60 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the open propulsor rotor 40, which propels the bypass air outside of and axially along the engine housing 34 via the bypass flowpath 54. The bypass air may account for a majority of thrust generated by the aircraft propulsion system 20, e.g., more than seventy-five percent (75%) of thrust. The aircraft propulsion system 20 of the present disclosure, however, is not limited to the foregoing exemplary thrust ratio.

To condition (e.g., de-swirl, etc.) the bypass air propelled aft by the open propulsor rotor 40, the aircraft propulsion system 20 of FIG. 1 includes one or more open (e.g., unducted) guide vanes 62 forming an open (e.g., unducted) guide vane array 64. This open guide vane array 64 is arranged with and downstream of the open propulsor rotor 40 at the exterior of the aircraft propulsion system 20. The open guide vane array 64 extends circumferentially about (e.g., completely around) the engine housing 34 and the axial centerline 22. Each of the open guide vanes 62 is connected to (e.g., cantilevered from) the engine housing 34. Each of the open guide vanes 62 includes an airfoil 66 that projects radially out from the engine housing 34 to a distal (e.g., unsupported, unducted, etc.) tip 68 of the airfoil 66.

One or more or all of the open guide vanes 62 may be configured as variable guide vanes. Each of the open guide vanes 62, for example, may be configured to pivot about a respective (e.g., radial) pivot axis 70. One or more of the open guide vanes 62 may also or alternatively be configured as fixed guide vanes.

Figure 2:
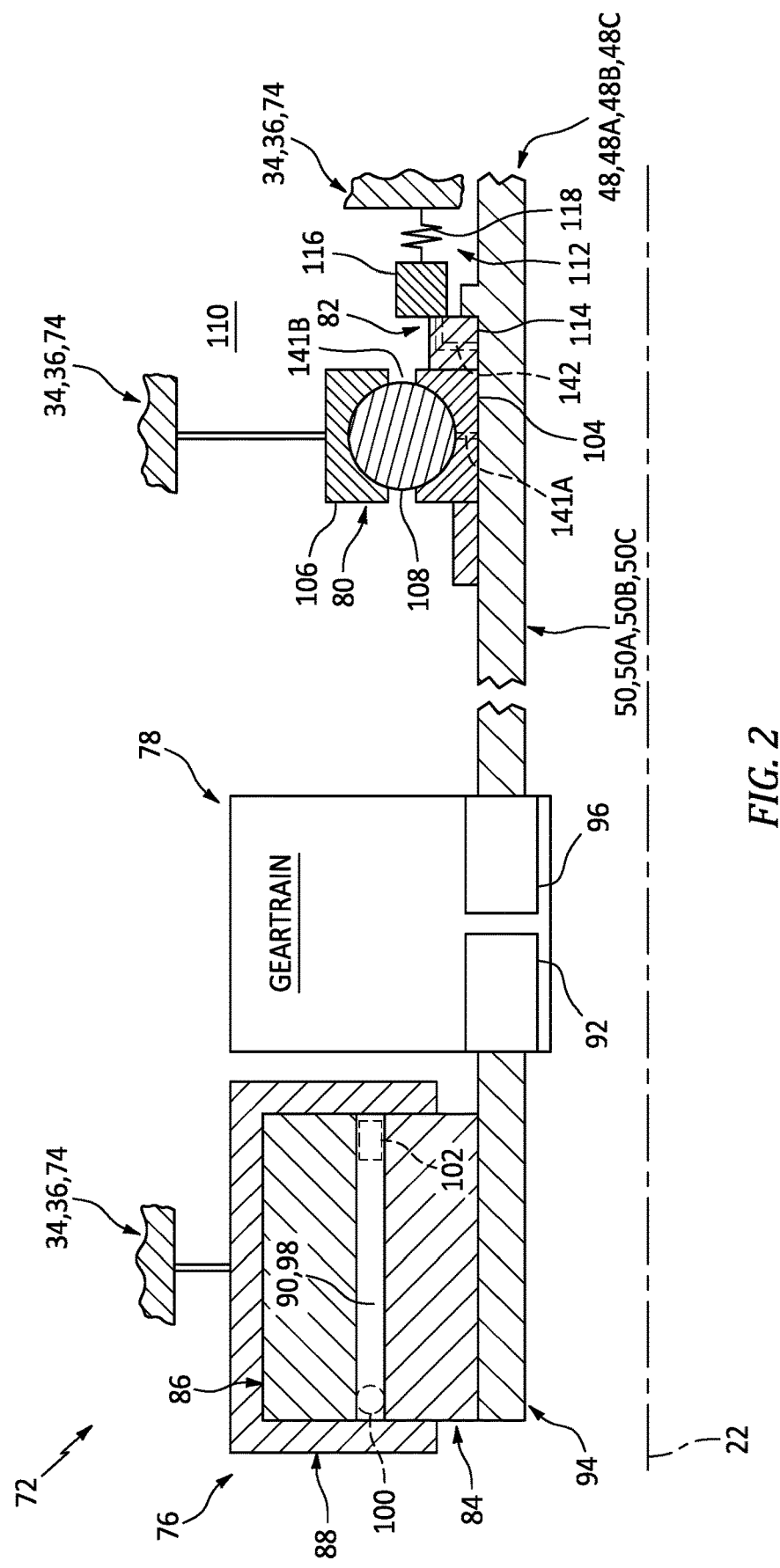
FIG. 2 is a partial side schematic illustration of an assembly for the aircraft propulsion system.

FIG. 2 is a partial side schematic illustration of an assembly 72 for the aircraft propulsion system 20. This propulsion system assembly 72 includes at least one of the propulsion system rotating structures 50A, 50B, 50C (generally referred to as "50"), a stationary structure 74, an electric machine 76 and a geartrain 78 rotatably coupling the electric machine 76 to the propulsion system rotating structure 50. The propulsion system assembly 72 of FIG. 1 also includes one or more propulsion system components 80 and 82 arranged with the propulsion system rotating structure 50.

The stationary structure 74 may be configured as or otherwise include any stationary (e.g., static, non-rotating) component or assembly of stationary components within the aircraft propulsion system 20. The stationary structure 74, for example, may be configured as or otherwise included as part of the engine housing 34. The stationary structure 74 of FIG. 2 includes the case 36 (see also FIG. 1) and one or more internal support structures within and connected to the case 36.

The electric machine 76 is configurable as an electric motor and/or an electric generator. For example, during a motor mode of operation, the electric machine 76 may operate as the electric motor to convert electricity (e.g., received from a battery and/or another electricity source) into mechanical power. This mechanical power may be utilized for various purposes within the aircraft propulsion system 20 such as, for example, rotating the propulsion system rotating structure 50 during aircraft propulsion system startup. During a generator mode of operation, the electric machine 76 may operate as the electric generator to convert mechanical power (e.g., received through the propulsion system rotating structure 50) into electricity. This electricity may be utilized for various purposes within the aircraft propulsion system 20 such as, for example, electrically powering one or more electric components of the aircraft propulsion system 20 and/or charging the battery. The electricity may also or alternatively be utilized for various purposes outside of the aircraft propulsion system 20 such as, for example, electrically powering one or more electric components in an aircraft.

The electric machine 76 includes an (e.g., annular) electric machine rotor 84 and an (e.g., annular) electric machine stator 86. The electric machine 76 also includes an (e.g., annular) electric machine case 88 that at least partially or completely houses the machine rotor 84 and/or the machine stator 86.

The machine rotor 84 is at least partially disposed within an internal cavity 90 of the machine case 88. The machine rotor 84 is connected (e.g., fixedly mounted) to the propulsion system rotating structure 50A, 50B, 50C and its shaft 48A, 48B, 48C (generally referred to as "48") through the geartrain 78. The machine rotor 84 of FIG. 2, for example, is mechanically coupled to a first component 92 (e.g., a gear or carrier) of the geartrain 78 through a coupler 94; e.g., a shaft. The propulsion system rotating structure 50A, 50B, 50C and its shaft 48A, 48B, 48C are mechanically coupled to a second component 96 (e.g., a gear or a carrier) of the geartrain 78. The machine rotor 84 is configured to rotate with the propulsion system rotating structure 50 and its shaft 48 about the axial centerline 22; e.g., a rotational axis of the propulsion system assembly 72.

The machine stator 86 is (e.g., completely) disposed within the internal cavity 90 of the machine case 88. The machine stator 86 is connected (e.g., fixedly mounted) to the stationary structure 74. The machine stator 86 of FIG. 2, for example, is fixedly connected to the machine case 88, and the machine case 88 is fixedly connected to the stationary structure 74.

The machine stator 86 of FIG. 2 axially overlaps the machine rotor 84 along the axial centerline 22, and extends circumferentially about (e.g., completely around, circumscribes) the machine rotor 84. The machine rotor 84 of FIG. 2 is thereby disposed within a bore of the machine stator 86. However, the machine rotor 84 may be radially spaced from the machine stator 86 by an annular radial clearance gap 98; e.g., an air gap. The machine rotor 84 may thereby be located in close proximity to, but may not contact, the machine stator 86.

The electric machine 76 may also include one or more internal electric machine bearings 100 and 102 (schematically shown). Each of these machine bearings 100 and 102 may be configured as a rolling element bearing. One of the machine bearings (e.g., 100), for example, maybe configured as a ball bearing, and the other one of the machine bearings (e.g., 102) may be configured as a roller bearing. These machine bearings 100 and 102 are arranged within the internal cavity 90 of the machine case 88. The machine bearings 100 and 102 are disposed radially between and are engaged with the machine rotor 84 and a stationary structure of the electric machine 76; e.g., the machine stator 86 of FIG. 2. The machine bearings 100 and 102 may thereby rotatably support the machine rotor 84 within the electric machine 76 as well as maintain the clearance gap 98 between the machine rotor 84 and the machine stator 86.

The geartrain 78 may be a speed change device between the propulsion system rotating structure 50 and its shaft 48 and the electric machine 76 and its machine rotor 84. The geartrain 78, for example, may be configured as an epicyclic geartrain. The geartrain 78 may configured as a speed reduction device when, for example, the electric machine 76 and its machine rotor 84 drive the propulsion system rotating structure 50. Alternatively, the geartrain 78 may configured as a speed reduction device when the propulsion system rotating structure 50 drives the electric machine 76 and its machine rotor 84. However, in other embodiments, the geartrain 78 may be omitted and the electric machine 76 and its machine rotor 84 may rotate at the same speed as the propulsion system rotating structure 50.

The rotating structure bearing 80 may be configured as a rolling element bearing. The rotating structure bearing 80 of FIG. 2, for example, includes a bearing inner race 104, a bearing outer race 106 and a plurality of bearing rolling elements 108. The inner race 104 is connected (e.g., fixedly mounted) to the propulsion system rotating structure 50 and its shaft 48. The outer race 106 is connected (e.g., fixedly mounted) to the stationary structure 74. The rolling elements 108 are arranged circumferentially about the axial centerline 22 in an array, and disposed radially between and engaged with the inner race 104 and the outer race 106. With this arrangement, the rotating structure bearing 80 is configured to rotatably mount the propulsion system rotating structure 50 with the stationary structure 74.

The seal assembly 82 is configured to seal an annular gap between the propulsion system rotating structure 50 and the stationary structure 74, or alternatively another component connected to the stationary structure 74. The seal assembly 82 may thereby fluidly isolate a first compartment 110 (e.g., a bearing cavity) within the aircraft propulsion system 20 from a second compartment 112 within the aircraft propulsion system 20.

The seal assembly 82 of FIG. 2 includes a seal land 114 and a seal element 116; e.g., a carbon seal element. The seal land 114 is connected (e.g., fixedly mounted) to the propulsion system rotating structure 50; e.g., the shaft 48. The seal land 114 is configured to rotate with the propulsion system rotating structure 50. The seal element 116 is connected (e.g., spring mounted) to the stationary structure 74 (or another component) via a biasing device 118; e.g., a spring. This biasing device 118 is configured to bias (e.g., push) the seal element 116 against the seal land 114 to maintain sealing engagement between these seal assembly components 114 and 116.

Figure 3:
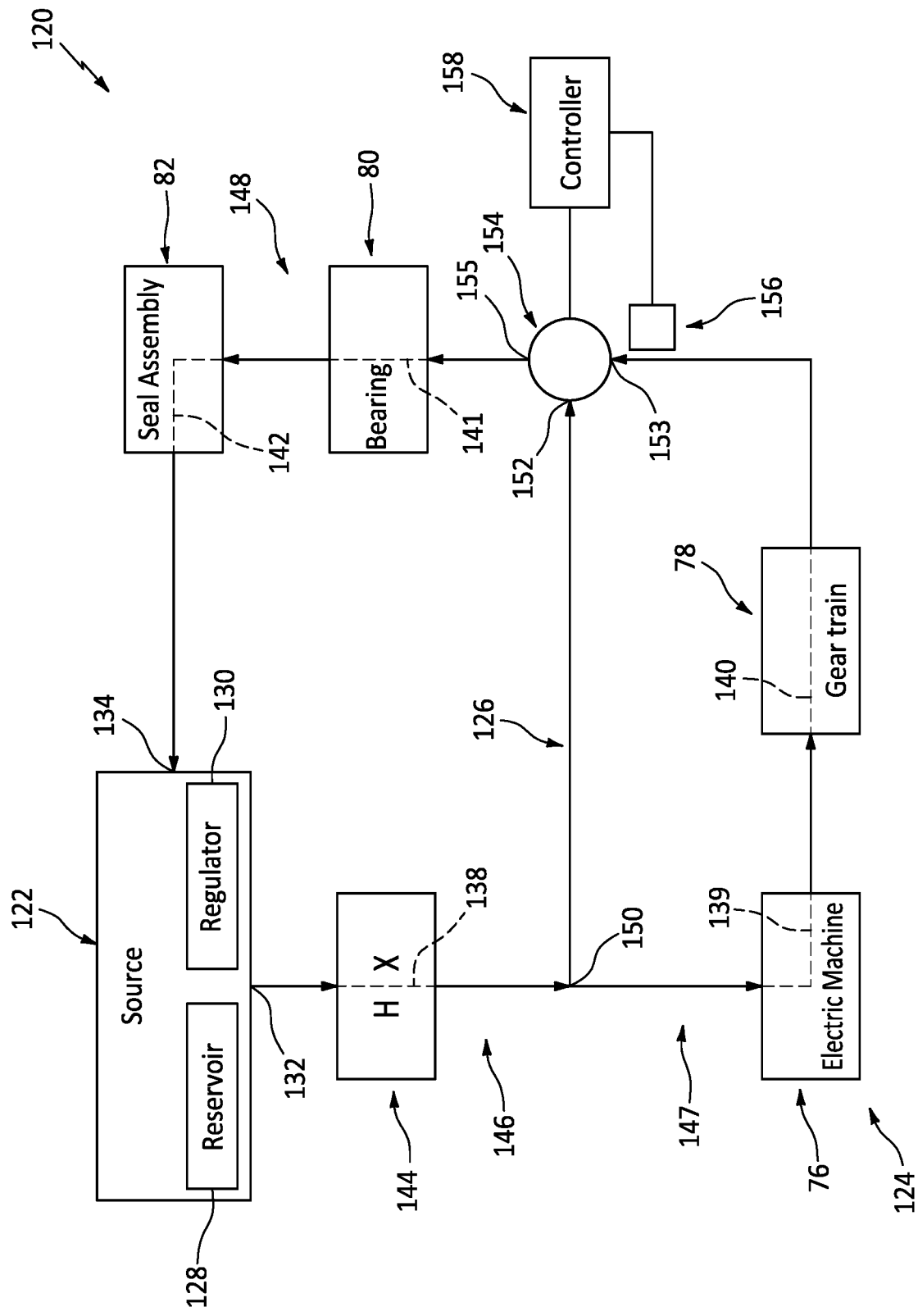
FIG. 3 is a schematic illustration of a lubrication system for the propulsion system assembly.

Various components of the propulsion system assembly 72 may utilize lubricant (e.g., oil or another liquid) during propulsion system operation. This lubricant may lubricate the assembly components and/or cool the assembly components. FIG. 3 schematically illustrates a lubrication system 120 for providing the lubricant to at least (or only) the propulsion system assembly 72. This lubrication system 120 includes a lubricant source 122 and a lubricant circuit 124. The lubrication system 120 of FIG. 3 also includes a bypass circuit 126.

The lubricant source 122 is configured to provide the lubricant to the lubrication system circuits 124 and 126 during lubrication system operation. The lubricant source 122 may also be configured to store (e.g., contain a quantity of) the lubricant before, during and/or after lubrication system operation. The lubricant source 122 of FIG. 3, for example, includes a lubricant reservoir 128 and a lubricant flow regulator 130. The lubricant flow regulator 130 may be or otherwise include a pump and/or a valve. This lubricant flow regulator 130 is configured to direct the lubricant received from the lubricant reservoir 128 to/through the lubrication system circuits 124 and 126.

The lubricant circuit 124 of FIG. 3 extends longitudinally from an inlet 132 of the lubricant circuit 124 to an outlet 134 of the lubricant circuit 124. The lubricant circuit inlet 132 of FIG. 3 is fluidly coupled with an outlet from the lubricant source 122; e.g., an outlet from the lubricant flow regulator 130. The lubricant circuit outlet 134 of FIG. 3 is fluidly coupled with an inlet to the lubricant source 122; e.g., an inlet to the lubricant reservoir 128. In some embodiments, the lubricant circuit 124 may form a single fluid flow path from the lubricant circuit inlet 132 to the lubricant circuit outlet 134. In other embodiments, referring to FIG. 4, the lubricant circuit 124 may include a plurality of sub-paths 136A and 136B arranged in parallel between the lubricant circuit inlet 132 to the lubricant circuit outlet 134.

The lubricant circuit 124 of FIG. 3 includes one or more internal volumes (e.g., 138-142) for one or more respective components (e.g., 144, 76, 78, 80 and 82) of the aircraft propulsion system 20. Each of the internal volumes (e.g., 138-142) may be or otherwise include an internal cavity, an internal passage and/or another space within and/or at least partially or completely formed by a respective propulsion system component, which internal volume is adapted to receive the lubricant. For example, the heat exchanger volume 138 may be configured as or otherwise include a passage and/or a cavity within a heat exchanger 144 for the lubrication system 120; e.g., a liquid-to-liquid heat exchanger or a liquid-to-gas heat exchanger. Briefly, this heat exchanger 144 is configured to cool (or heat) the lubricant directed through the lubrication system circuits 124 and 126. The machine volume 139 may be configured as or otherwise include a passage and/or a cavity (e.g., the internal cavity 90 of FIG. 2 and/or a bearing cavity) within the electric machine 76. The geartrain cavity 140 may be configured as or otherwise include a passage (e.g., a bearing passage, a gear passage, etc.) and/or a cavity (e.g., a bearing and/or gear cavity) within the geartrain 78. The bearing volume 141 may be configured as or otherwise includes a passage 141A within and/or a space 141B (see FIG. 2) at least partially formed by the rotating structure bearing 80. The seal assembly volume 142 may be configured as or otherwise include a passage within and/or a space at least partially formed by the seal assembly 82 and one or more of its components 114 and 116 (see FIG. 2). The lubrication system 120 of the present disclosure, however, is not limited to the foregoing exemplary internal volumes. For example, in other embodiments, any one or more of the internal volumes 140-142 may be omitted from the lubricant circuit 124.

The lubricant circuit 124 may include one or more lubricant circuit sections 146-148. These lubricant circuit sections 146-148 are arranged in series between the lubricant circuit inlet 132 and the lubricant circuit outlet 134. The inlet circuit section 146, for example, extends longitudinally from the lubricant circuit inlet 132 to the intermediate circuit section 147. The intermediate circuit section 147 is fluidly coupled with the inlet circuit section 146 and the outlet circuit section 148. The intermediate circuit section 147 extends longitudinally from the inlet circuit section 146 to the outlet circuit section 148, thereby arranging the intermediate circuit section 147 downstream of the inlet circuit section 146 and upstream of the outlet circuit section 148. The outlet circuit section 148 extends longitudinally from the intermediate circuit section 147 to the lubricant circuit outlet 134.

The inlet circuit section 146 includes the heat exchanger volume 138, where the heat exchanger volume 138 is downstream of the lubricant source 122, and where the lubricant flow regulator 130 (e.g., the pump and/or valve) may be fluidly coupled between the lubricant reservoir 128 and the heat exchanger volume 138. The intermediate circuit section 147 includes the machine volume 139 and the geartrain volume 140. Within the intermediate circuit section 147 of FIG. 3, the machine volume 139 is upstream of the geartrain volume 140. The outlet circuit section 148 includes the bearing volume 141 and the seal assembly volume 142. Within the outlet circuit section 148 of FIG. 3, the bearing volume 141 is upstream of the seal assembly volume 142. However, in other embodiments, the seal assembly volume 142 may be upstream of the bearing volume 141. In still other embodiments, referring to FIG. 4, the bearing volume 141 and the seal assembly volume 142 may be arranged in parallel with one another between the intermediate circuit section 147 and the lubricant circuit outlet 134.

The bypass circuit 126 of FIG. 3 extends longitudinally from an inlet 150 of the bypass circuit 126 to an outlet 152 of the bypass circuit 126. The bypass circuit inlet 150 of FIG. 3 is fluidly coupled with the lubricant circuit 124 at an upstream point; e.g., at a node between the inlet circuit section 146 and the intermediate circuit section 147. This upstream point is upstream of the machine volume 139 and/or the geartrain volume 140 along the lubricant circuit 124. The bypass circuit outlet 152 of FIG. 3 is also fluidly coupled with the lubricant circuit 124 at a downstream point; e.g., at a node between the intermediate circuit section 147 and the outlet circuit section 148. The bypass circuit outlet 152 and an outlet 153 from the intermediate circuit section 147, for example, may be fluidly coupled to an inlet 155 to the outlet circuit section 148 through a flow regulating valve 154; e.g., a metering valve. The downstream point is downstream of the machine volume 139 and/or the geartrain volume 140 along the lubricant circuit 124. The bypass circuit 126 thereby provides a path that fluidly bypasses the machine volume 139 and/or the geartrain volume 140. Here, the bypass circuit 126 is arranged in parallel with the intermediate circuit section 147 between the inlet circuit section 146 and the outlet circuit section 148.

During operation, the lubricant source 122 directs the lubricant through the inlet circuit section 146 to the intermediate circuit section 147 and the bypass circuit 126. Within the inlet circuit section 146, the heat exchanger 144 cools (or heats) the lubricant to a first temperature. This first temperature may be selected (e.g., optimized) for operation of the electric machine 76. For example, the first temperature may be relatively cool to reduce or prevent heat related degradation of material(s) such as resin, etc. within the electric machine 76 and its windings. However, as the lubricant flows through the electric machine 76, the lubricant may be heated to an elevated second temperature that is greater than the first temperature, for example, during normal aircraft propulsion system operation. The geartrain volume 140 may thereby receive the lubricant at or about the second temperature, where the lubricant circuit 124 and its intermediate circuit section 147 may be configured such that the second temperature is selected (e.g., optimized) for operation of the geartrain 78. The second temperature, for example, may be five degrees Celsius (5° C.), ten degrees Celsius (10° C.), twenty degrees Celsius (20° C.) or more than the first temperature. The present disclosure, however, is not limited to such an exemplary lubricant temperature relationship.

As the lubricant flows through the geartrain 78, the lubricant may be further heated to an elevated third temperature that is greater than the second temperature. A sensor 156 (e.g., a thermocouple) arranged with the intermediate circuit section 147 measures the third temperature of the lubricant within the intermediate circuit section 147, for example, at (e.g., on, adjacent or proximate) the flow regulating valve 154. The sensor 156 provides a sensor signal to a controller 158 indicative of the measured third temperature. The controller 158 processes the sensor signal, and provides a control signal to the flow regulating valve 154 based on the sensor signal. For example, where controller 158 determines the third temperature is equal to or below a threshold, the controller 158 may signal the flow regulating valve 154 to fluidly decouple the bypass circuit 126 (with the lubricant at the relatively cool first temperature) from the outlet circuit section 148, or otherwise reduce lubricant flow from the bypass circuit 126 to the outlet circuit section 148. However, where the controller 158 determines the third temperature is above the threshold, the controller 158 may signal the flow regulating valve 154 to fluidly couple the bypass circuit 126 with the outlet circuit section 148, or otherwise increase lubricant flow from the bypass circuit 126 to the outlet circuit section 148. The controller 158 may thereby operate the flow regulating valve 154 to selectively mix (or not mix) lubricant from the intermediate circuit section 147 and the bypass circuit 126 in order to direct the lubricant to the propulsion system components 80 and 82 at (or about) a fourth temperature. This fourth temperature may be selected (e.g., optimized) for operation of one or more of the propulsion system components 80 and 82. The fourth temperature may be equal to or different (e.g., greater or less) than the second temperature and/or the third temperature. The present disclosure, however, is not limited to such an exemplary lubricant temperature relationship.

With the foregoing configuration, the lubrication system 120 may provide the lubricant to the various internal volumes for the propulsion system components at different temperatures generally tailored for operation of those respective propulsion system components. Providing the single lubrication system 120 for the various propulsion system components may also reduce space requirements within the aircraft propulsion system 20 since the propulsion system components may share/be serviced by common elements; e.g., the lubricant reservoir 128, the lubricant flow regulator 130, the heat exchanger 144, etc.

The lubrication system 120 is described above providing the lubricant to certain exemplary components. Of course, in other embodiments, any one or more of the propulsion system components may be replaced by another component of the aircraft propulsion system 20 which may utilize the lubricant, for example, for heating, cooling and/or lubrication. The lubricant circuit 124 may also or alternatively include one or more additional fluid components other than those described above. Examples of these other components may include, but are not limited to, heat exchanger(s), sensor(s), manifold(s), additional bearing(s), a geartrain, nozzle(s), etc. The lubricant circuit 124 and, for example, its outlet circuit section 148 may also or alternatively include an internal volume for the geartrain 46 of FIG. 1.

Figure 4:
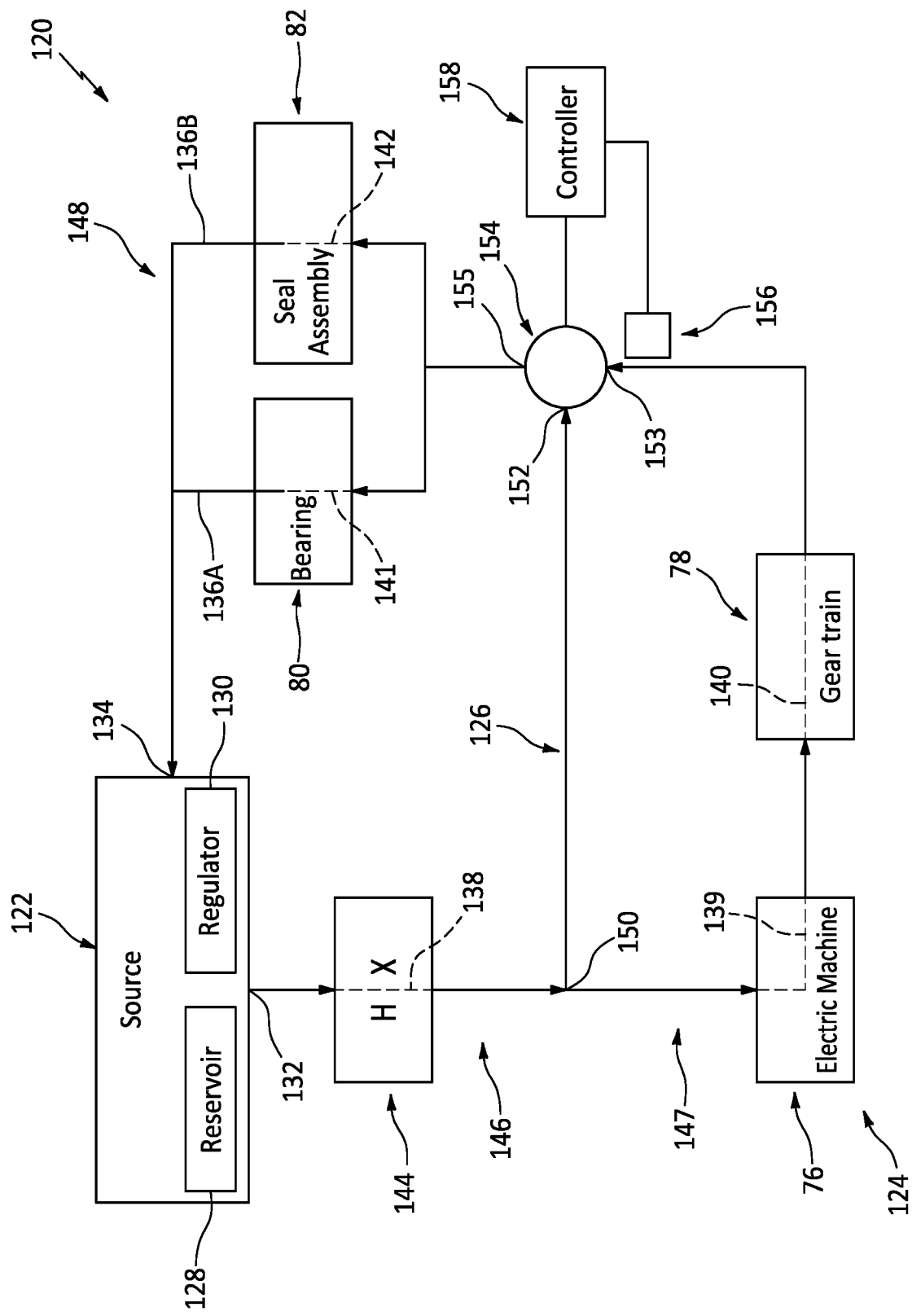
FIG. 4 is a schematic illustration of the lubrication system configured with parallel sub-paths within a lubricant circuit.

While the propulsion system assembly 72 and the lubrication system 120 of FIGS. 2-4 are described above in association with the open rotor aircraft propulsion system 20 of FIG. 1 with a tractor configuration, the present disclosure is not limited thereto. For example, in other embodiments, the propulsion system assembly 72 and/or the lubrication system 120 may be configured with an open rotor aircraft propulsion system with a pusher configuration; e.g., a pusher fan propulsion system. In still other embodiments, the propulsion system assembly 72 and/or the lubrication system 120 may be configured with other types of engine systems such as, but not limited to, a turbofan propulsion system, a turbojet propulsion system, a turboprop propulsion system, a turboshaft propulsion system and an auxiliary power unit (APU).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   an electric machine comprising a machine volume and a machine rotor;
   a rotating structure comprising a bladed rotor;
   a geartrain coupling the machine rotor to the rotating structure, the geartrain comprising a geartrain volume;
   a propulsion system component arranged with the rotating structure, the propulsion system component comprising a component volume; and a lubrication system including a lubricant circuit, a bypass circuit, and a lubricant source, the lubricant source configured to direct lubricant through the lubricant circuit, the lubricant circuit including the machine volume, the geartrain volume and the component volume, in series, and the lubricant source further configured to direct the lubricant through the bypass circuit to the component volume, bypassing the machine volume and the geartrain volume.

2. The assembly of claim 1, wherein the machine volume is fluidly coupled between an outlet from the lubricant source and an inlet to the geartrain volume.

3. The assembly of claim 1, wherein the machine volume is fluidly coupled between an outlet from the lubricant source and an inlet to the component volume.

4. The assembly of claim 1, wherein the geartrain volume is fluidly coupled between an outlet from the machine volume and an inlet to the component volume.

5. The assembly of claim 1, wherein
the lubricant circuit includes an upstream circuit section and a downstream circuit section; and
the lubrication system further includes a mixing valve selectively fluidly coupling the bypass circuit and the upstream circuit section to the downstream circuit section.

6. The assembly of claim 5, wherein
the upstream circuit section includes the machine volume; and
the downstream circuit section includes the component volume.

7. The assembly of claim 6, wherein the upstream circuit section further includes the geartrain volume.

8. The assembly of claim 5, wherein
the lubrication system further includes a sensor and a controller;
the sensor is configured to output a sensor signal to the controller indicative of a temperature of the lubricant within the upstream circuit section at the mixing valve; and
the controller is configured to output a control signal to the mixing valve based on the sensor signal.

9. The assembly of claim 1, wherein the lubrication system further includes a heat exchanger fluidly coupled between the lubricant source and the machine volume.

10. The assembly of claim 1, wherein the electric machine is configurable as at least one of a generator during a generator mode of operation; or
a motor during a motor mode of operation.

11. The assembly of claim 1, wherein the bladed rotor comprises one of
a compressor rotor within a compressor section of the aircraft propulsion system; or
a turbine rotor within a turbine section of the aircraft propulsion system.

12. The assembly of claim 1, wherein the geartrain comprises an epicyclic geartrain.

13. The assembly of claim 1, wherein the propulsion system component comprises a bearing rotatably supporting the rotating structure.

14. The assembly of claim 1, wherein the propulsion system component comprises a seal assembly.

15. The assembly of claim 1, further comprising:
a gas turbine engine core comprising the rotating structure; and
an unducted propulsor rotor rotatably driven by the gas turbine engine core.

16. The assembly of claim 15, further comprising:
a second geartrain coupling the gas turbine engine core to the unducted propulsor rotor;
the second geartrain comprising the propulsion system component.

17. An assembly for an aircraft propulsion system, comprising:
an electric machine comprising a machine volume and a machine rotor;
a rotating structure rotatably coupled to the machine rotor, the rotating structure comprising a bladed rotor;
a propulsion system component arranged with the rotating structure, the propulsion system component comprising a component volume; and
a lubrication system including a lubricant circuit and a lubricant source configured to direct lubricant through the lubricant circuit, the lubricant circuit including the machine volume and the component volume, in series; and
the lubrication system further including a bypass circuit, and the lubricant source further configured to direct the lubricant through the bypass circuit to the component volume to bypass the machine volume.

* * * * *